(12) United States Patent
Wu et al.

(10) Patent No.: US 7,476,011 B2
(45) Date of Patent: Jan. 13, 2009

(54) LAMP ASSEMBLY WITH VARIABLE ILLUMINATING DIRECTION

(76) Inventors: Sheng-Lung Wu, No. 7-1, Shen-Keng Lane, Che-Cheng Tsun, Shui-Li Hsiang, Nan-Tou Hsien (TW); Chien-Hung Lee, No. 154, Sec. 1, Yu-Yuan Rd., Ta-Tu Hsiang, Taichung Hsien (TW)

( * ) Notice: Subject to any disclaimer, the term of this patent is extended or adjusted under 35 U.S.C. 154(b) by 311 days.

(21) Appl. No.: 11/364,519

(22) Filed: Feb. 27, 2006

(65) Prior Publication Data

US 2007/0201218 A1 Aug. 30, 2007

(51) Int. Cl.
*F21V 33/00* (2006.01)
(52) U.S. Cl. .................. 362/465; 362/464; 362/53; 362/54
(58) Field of Classification Search .............. None
See application file for complete search history.

(56) References Cited

U.S. PATENT DOCUMENTS

| | | | | |
|---|---|---|---|---|
| 5,099,400 A | * | 3/1992 | Lee | 362/37 |
| 5,909,949 A | * | 6/1999 | Gotoh | 362/37 |
| 6,309,082 B1 | * | 10/2001 | Wu | 362/37 |

* cited by examiner

*Primary Examiner*—Laura Tso
(74) *Attorney, Agent, or Firm*—Christie, Parker & Hale, LLP

(57) ABSTRACT

A vehicle lamp assembly includes a transmission axle coupled to a lamp unit, and a drive unit for driving the transmission axle to rotate such that the lamp unit is movable to a selected one of a default position, where the illuminating direction of the lamp unit is parallel to a vehicle axis, and left and right limit positions, where the illuminating direction forms left and right limit angles with the vehicle axis, respectively. A detecting device generates a default position signal when the lamp unit is at the default position. A control device is operable to control the drive unit for restoring the lamp unit to the default position with reference to the default position signal, and for moving the lamp unit according to angular displacement of a vehicle steering linkage system.

13 Claims, 5 Drawing Sheets

LAMP ASSEMBLY WITH VARIABLE ILLUMINATING DIRECTION

BACKGROUND OF THE INVENTION

1. Field of the Invention

The invention relates to a vehicle lamp assembly, more particularly to a vehicle lamp assembly with variable illuminating direction.

2. Description of the Related Art

Vehicles are generally equipped with fog lights, which are capable of long range illumination to assist drivers in viewing road conditions during heavy rain, thick fog, or at night. Fog lights are usually fixed to a front end of a vehicle and only illuminate an area directly in front of the vehicle. Hence, effectiveness of the fog lights is seriously diminished when the vehicle is moving along a winding road.

SUMMARY OF THE INVENTION

Therefore, the object of the present invention is to provide a lamp assembly capable of variable illuminating direction according to the steering direction of a vehicle so as to overcome the above drawback associated with the prior art.

Accordingly, a lamp assembly of this invention is adapted for use with a vehicle that includes a steering linkage system, and comprises a base, a lamp unit, a driving device, a detecting device, and a control device.

The driving device is mounted to the base, and includes a transmission axle that is coupled to the lamp unit, and a drive unit for driving the transmission axle to rotate in opposite first and second directions relative to the base such that the lamp unit is movable to a selected one of a default position, where the lamp unit has an illuminating direction parallel to a vehicle axis, and left and right limit positions, where the illuminating direction of the lamp unit forms left and right limit angles with the vehicle axis, respectively.

The detecting device includes a detected component provided on the transmission axle, and a default sensing component provided on the base and cooperating with the detected component so as to generate a default position signal when the lamp unit is at the default position.

The control device is coupled to the driving device and the detecting device, and is operable so as to control the driving device to restore the lamp unit to the default position with reference to the default position signal from the detecting device. The control device is adapted to be coupled to the steering linkage system, and is further operable in response to user manipulation of the steering linkage system so as to control the driving device to move the lamp unit according to angular displacement of the steering linkage system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
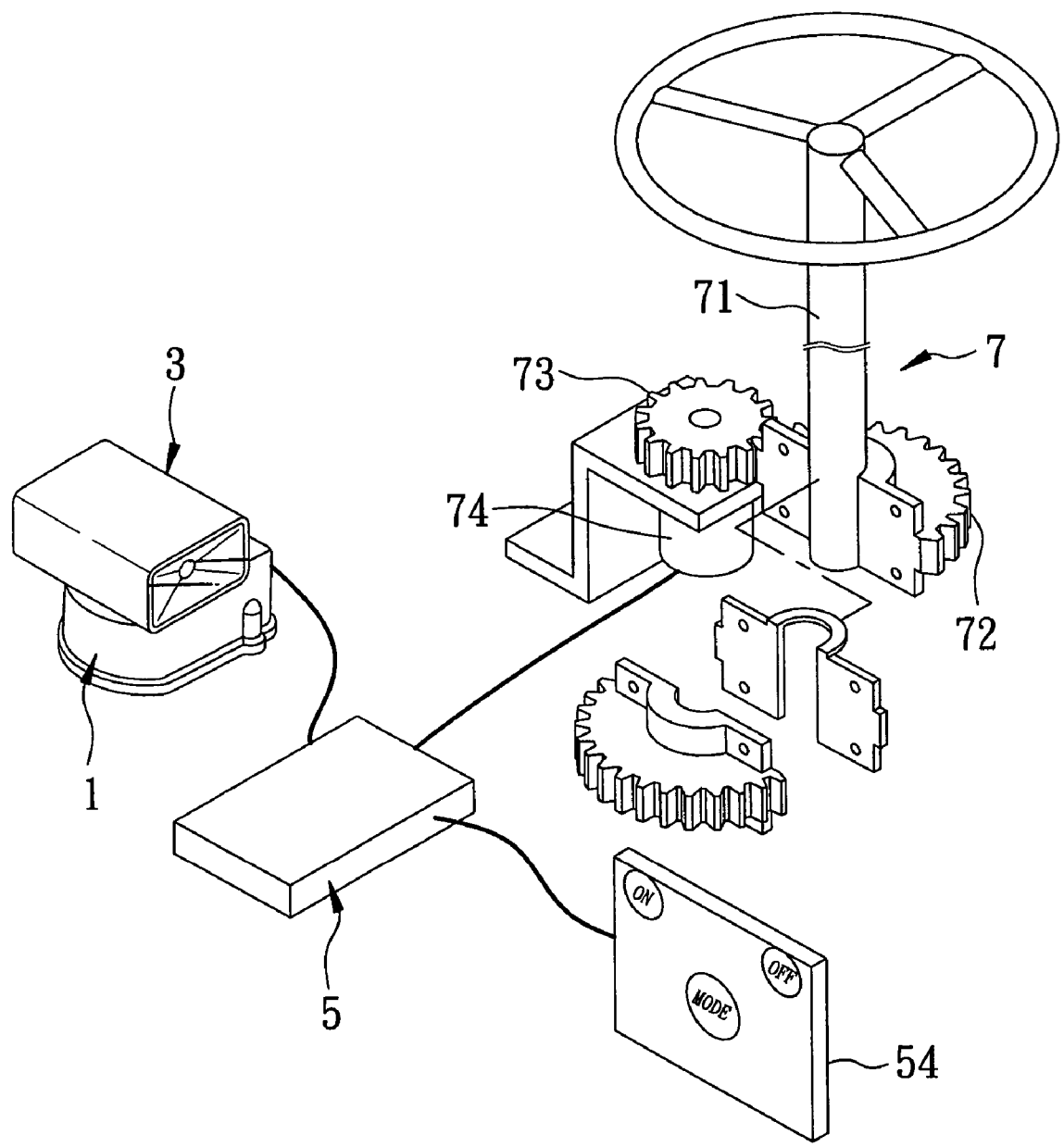
FIG. 1 is a perspective view to illustrate a vehicle steering linkage system and the preferred embodiment of a lamp assembly according to the present invention.
Figure 2:
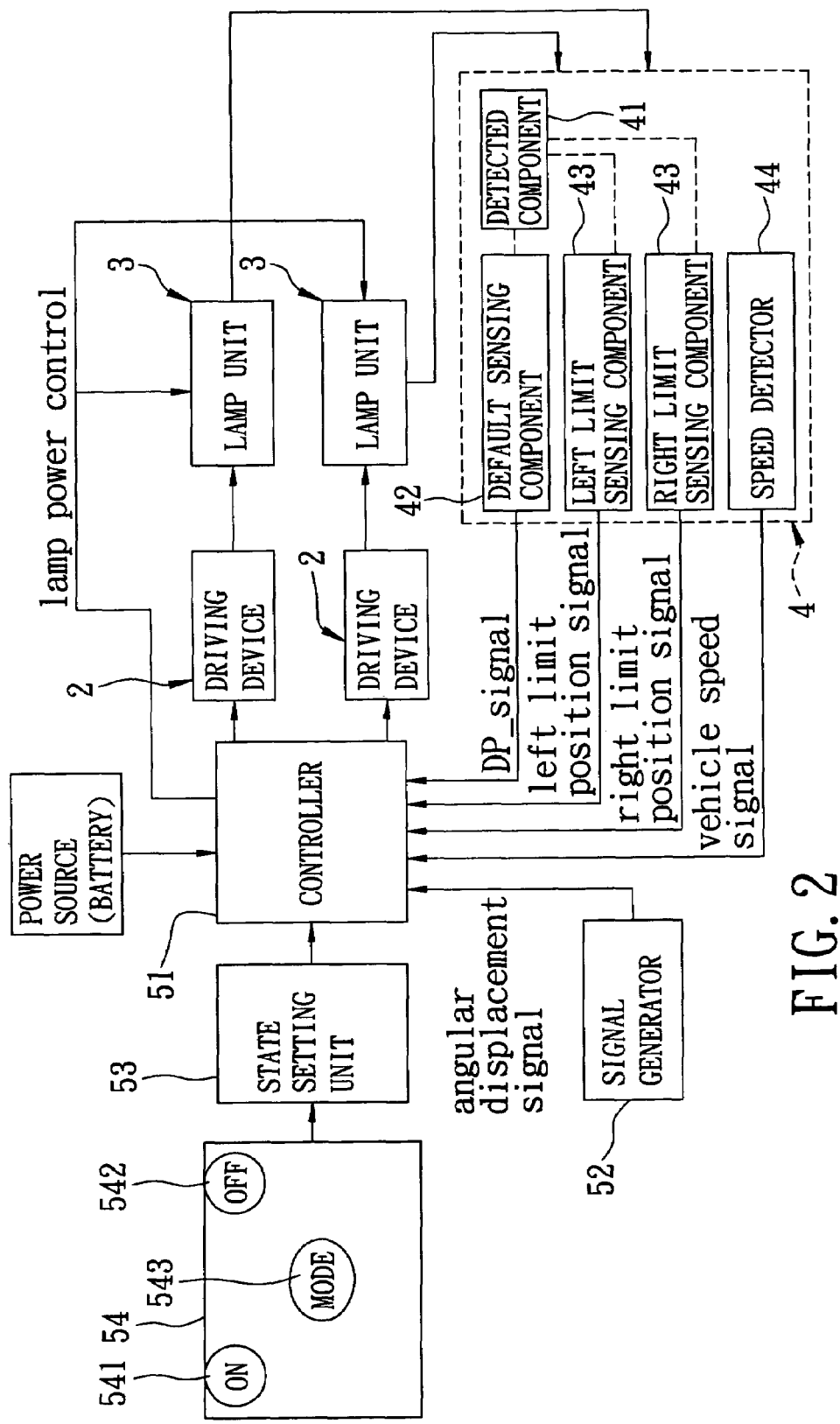
FIG. 2 is a schematic circuit block diagram of the preferred embodiment.

Referring to FIGS. 1 and 2, the preferred embodiment of a lamp assembly according to the present invention is shown to be adapted for use with a vehicle (not shown) that includes a steering linkage system 7. The steering linkage system 7 is manipulated by a vehicle driver to steer the vehicle in a conventional manner, and includes a steering rod 71, a drive gear 72 fixed to the steering rod 71, a driven gear 73 meshing with the drive gear 72, and a variable resistor 74 connected coaxially to the driven gear 73. The resistance of the variable resistor 74 varies with the angular displacement of the steering rod 71. The lamp assembly comprises a pair of bases 1 (only one is shown in FIG. 1), a pair of lamp units 3, a pair of driving devices 2, a pair of detecting devices 4 (only one is shown in FIG. 2), and a control device 5.

Figure 3:
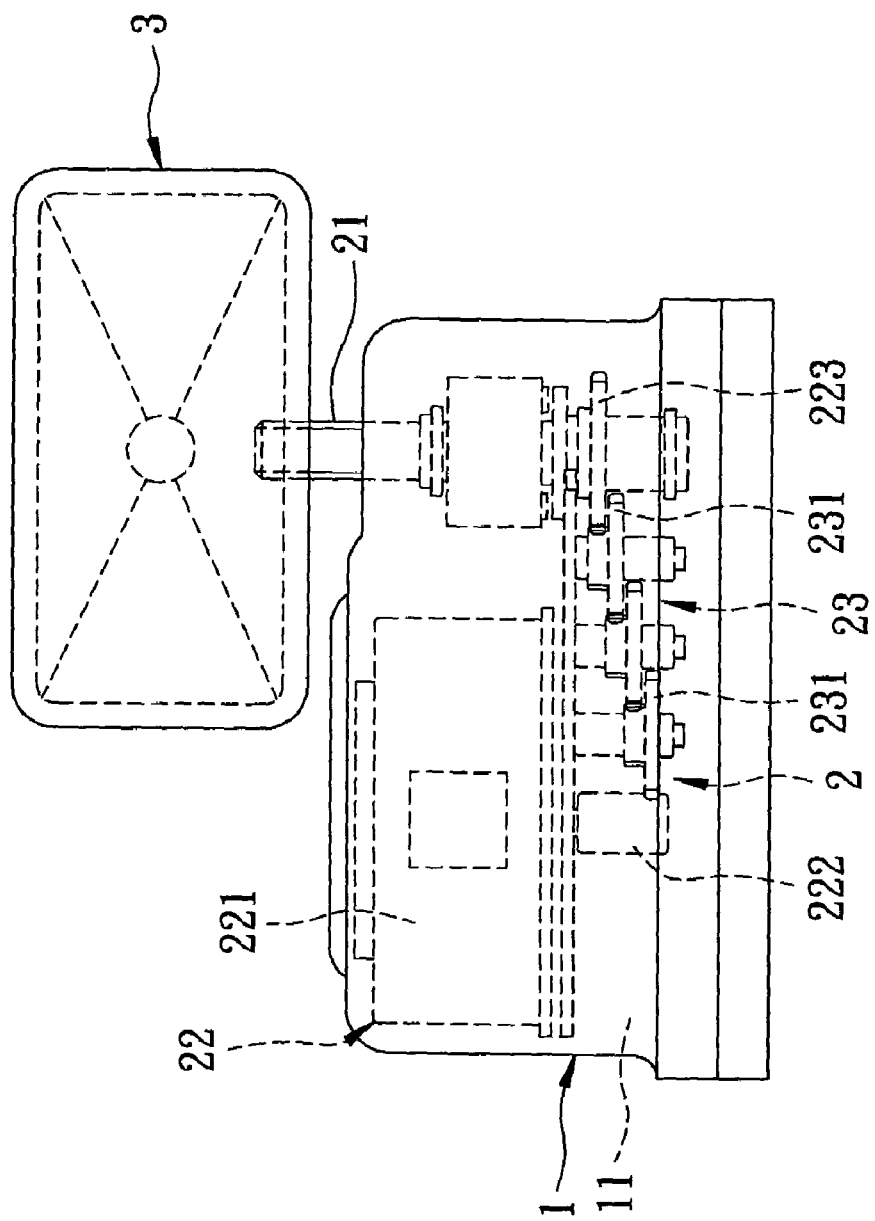
FIG. 3 is a schematic side view of the preferred embodiment.
Figure 4:
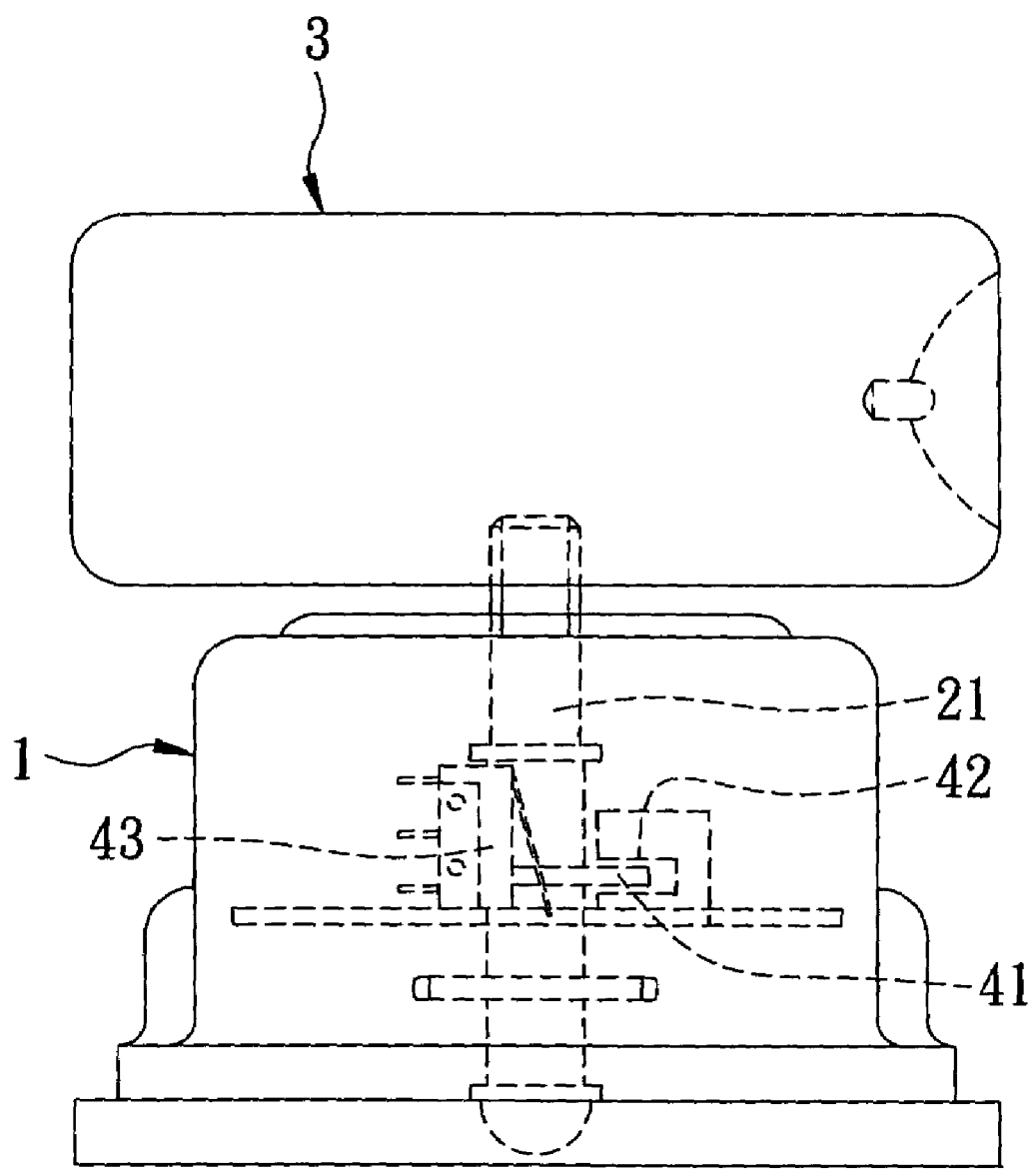
FIG. 4 is a schematic front view of the preferred embodiment.

With further reference to FIGS. 3 and 4, each of the bases 1 confines a compartment 11. Each base 1 may be mounted under a front vehicle bumper or on a front end of a vehicle roof according to the vehicle type to optimize the illuminating effect.

Each of the driving devices 2 is mounted in the compartment 11 of a respective one of the bases 1, and includes a transmission axle 21 and a drive unit 22. The transmission axle 21 has one end that extends out of the respective base 1 for coupling fixedly with a respective one of the lamp units 3. The drive unit 22 is used to drive the transmission axle 21 to rotate in opposite first and second directions (e.g., clockwise and counterclockwise directions) relative to the respective base 1 such that the respective lamp unit 3 is movable to a selected one of a default position, where the respective lamp unit 3 has an illuminating direction parallel to a vehicle axis, and left and right limit positions, where the illuminating direction of the respective lamp unit 3 forms left and right limit angles with the vehicle axis, respectively. In this embodiment, the drive unit 22 includes a motor 221, a drive gear 222 coupled to and driven by the motor 221, and a driven gear 223 coupled to the transmission axle 21 and driven by the drive gear 221 through a speed-reducing gear unit 23 that meshes with the drive and driven gears 222, 223 and that includes a set of speed-reducing gears 231. The transmission axle 21 thus rotates at a slower speed in view of the speed-reducing gear unit 23.

Figure 5:
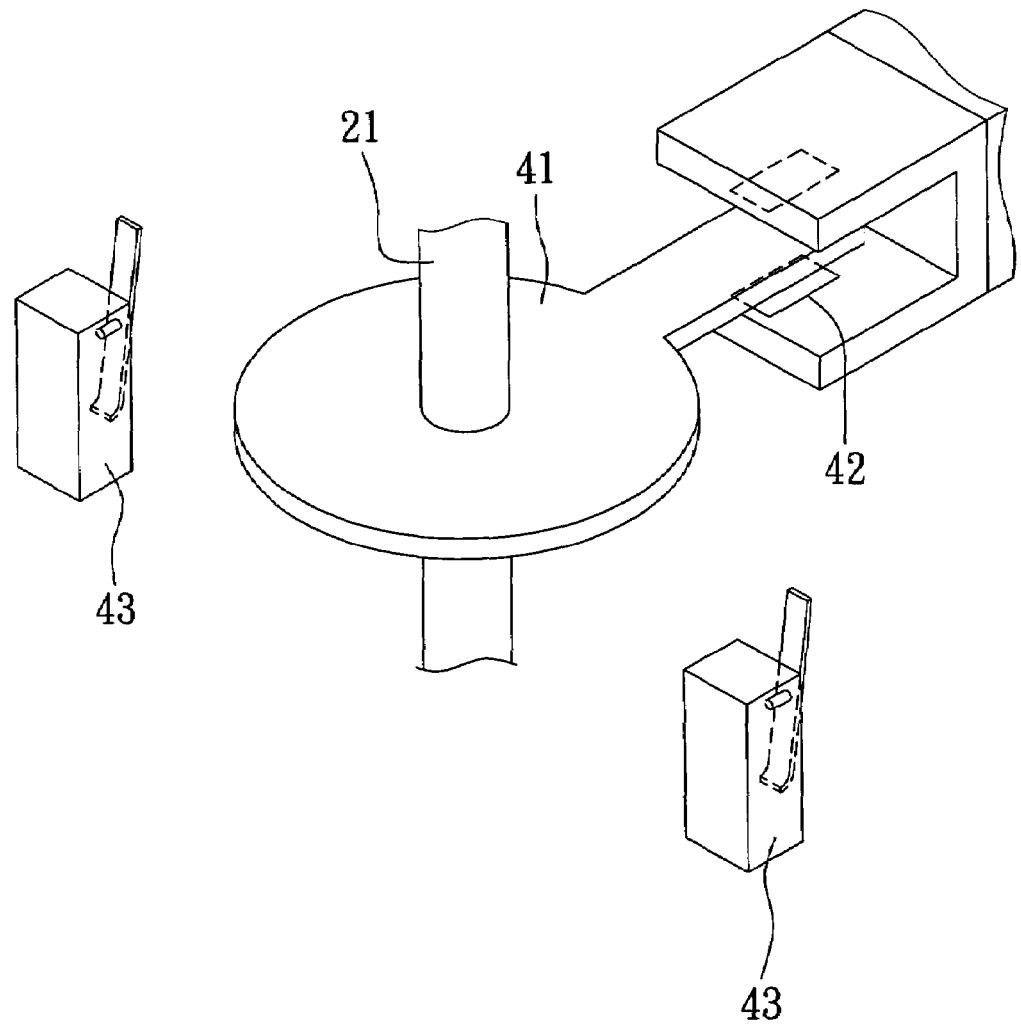
FIG. 5 is a fragmentary perspective view to illustrate a detecting device of the preferred embodiment.

With further reference to FIG. 5, each of the detecting devices 4 includes a detected component 41 provided on the transmission axle 21 of a respective one of the driving devices 2, and a default sensing component 42 provided in the compartment 11 of a respective one of the bases 1. The default sensing component 42 cooperates with the detected component 41 so as to generate a default position signal (DP_signal) when the respective one of the lamp units 3 is at the default position. In this embodiment, the default sensing component 42 includes a known optical sensor, and the detected component 41 includes a light shield detected by the optical sensor when the respective lamp unit 3 is at the default position. Each detecting device 4 further includes left and right limit sensing components 43 mounted in the compartment 11 and having the respective transmission axle 21 disposed therebetween. Each of the left and right limit sensing components 43 cooperates with the detected component 41 so as to generate a limit position signal when the respective lamp unit 3 is at a corresponding one of the left and right limit positions. In this embodiment, each of the left and right limit angles formed by the illuminating direction of the lamp unit 3 relative to the vehicle axis when the lamp unit 3 is at the left or right limit position is at least 90 degrees, and each of the left and right limit sensing components 43 includes a contact switch that is contacted by the detected component 41 when the respective lamp unit 3 is at the corresponding one of the left and right limit positions. One of the detecting devices 4 further includes a speed detector 44 that is adapted to detect vehicle speed and to generate a vehicle speed signal corresponding to the vehicle speed detected thereby.

Referring once again to FIGS. 1 and 2, the control device 5 is coupled to the driving devices 2, the detecting devices 4, and the variable resistor 74 of the steering linkage system 7, and includes a controller 51, a signal generator 52, a state setting unit 53, and a control panel 54. The controller 51 receives the default position signals, the limit position signals, and the vehicle speed signal, and is operable so as to control the driving devices 2 to restore the lamp units 3 to the default position with reference to the default position signals from the default sensing components 42 of the detecting devices 4. Moreover, by referring to the limit position signals received from the left and right limit sensing components 43 of the detecting devices 4, the controller 51 is able to control the driving devices 2 to stop continued rotation of the transmission axles 21 in one of the first and second directions when the lamp units 3 reach the corresponding one of the left and right limit positions. The signal generator 52 is coupled to the variable resistor 74 of the steering linkage system 7, and is adapted to generate an angular displacement signal indicative of the angular displacement of the steering rod 71 of the steering linkage system 7. The signal generator 52 is coupled to the controller 51 so as to provide the angular displacement signal thereto. The controller 51 is responsive to the angular displacement signal so as to control the driving devices 4 to move the lamp units 3 according to the angular displacement of the steering rod 71. In this embodiment, by referring to the vehicle speed signal from the speed detector 44, the controller 51 can control the driving devices 2 to restore the lamp units 3 to the default position when the vehicle speed signal indicates zero vehicle speed, and to move the lamp units 3 to change the illuminating direction according to the angular displacement of the steering rod 71 when the vehicle speed signal indicates non-zero vehicle speed. The state setting unit 53 is coupled to the controller 51 for selectively enabling and disabling operation of the controller 51 in an automatic control mode, where the lamp units 3 are moved automatically under the control of the controller 51 to change the illuminating direction according to the angular displacement of the steering rod 71. The control panel 54 is coupled to the state setting unit 53, and includes at least one control key for controlling activation and deactivation of the lamp units 3, and a mode key 543 for selectively enabling and disabling the automatic control mode. In this embodiment, the control panel 54 includes an ON key 541 for controlling activation of the lamp units 3, and an OFF key 542 for controlling deactivation of the lamp units 3. Preferably, the controller 51 controls the driving devices 2 to restore the lamp units 3 to the default position each time power to the lamp units 3 is activated (i.e., when the ON key 541 of the control panel 54 is operated). Preferably, the controller 51 further controls the driving devices 2 to restore the lamp units 3 to the default position each time power to the lamp units 3 is deactivated (i.e., when the OFF key 542 of the control panel 54 is operated)

In use, when the vehicle driver operates the mode key 543 of the control panel 54 to enable the automatic control mode, and subsequently operates the ON key 541 of the control panel 54 to activate the lamp units 3, the controller 51 initially controls the driving devices 2 to move the lamp units 3 to the default position.

When moving the lamp units 3 to the default position, the driving devices 2 are controlled to rotate the transmission axles 21 in one of the first and second directions until the detected component 41 of each of the detecting devices 4 is detected by the respective default sensing component 42, which indicates that the respective lamp unit 3 has reached the default position, or until the detected component 41 abuts against one of the left and right limit sensing components 43, which indicates that the respective lamp unit 3 has reached one of the left and right limit positions. In the latter case, the controller 51 will respond to the limit position signal received thereby to control the driving devices 4 to rotate the transmission axles 21 in the opposite direction until the detected components 41 of the detecting devices 4 are detected by the default sensing components 42.

In the meantime, the signal generator 52 generates the angular displacement signal based on the resistance of the variable resistor 74 of the steering linkage system 7, and provides the same to the controller 51. The controller 51 then controls the driving devices 2 to move the lamp units 3 in accordance with the angular displacement signal, i.e., according to the angular displacement of the steering rod 71 of the steering linkage system7. As a result, the illuminating direction of the lamp units 3 varies concurrently with the vehicle steering direction when the controller 51 is operated in the automatic control mode.

Thereafter, when the OFF key 542 of the control panel 54 is operated to deactivate the lamp units 3, the controller 51 controls the driving devices 2 to restore the lamp units 3 to the default position in the manner described hereinabove.

On the other hand, the lamp units 3 are maintained at the default position regardless of activation or deactivation of the lamp units 3 when operation of the controller 51 in the automatic control mode is disabled.

As mentioned herein above, by referring to the vehicle speed signal from the speed detector 44, the controller 51 can control the driving devices 2 to restore the lamp units 3 to the default position when the controller 51 is operated in the automatic control mode and when the vehicle speed signal indicates zero vehicle speed (e.g., when the vehicle is parked or is stopped due to a red traffic light). Therefore, the light radiated by the lamp units 3 can be prevented from interfering with the vision of drivers of vehicles that are in front or that are on the opposite lane. The controller 51 controls the driving devices 2 to move the lamp units 3 to change the illuminating direction according to the angular displacement of the steering rod 71 only when the vehicle speed signal indicates non-zero vehicle speed, i.e., the vehicle is moving.

Moreover, if the lamp units 3 deviate from ideal angular orientations relative to the steering linkage system 7 due to interference of an object with transmission of the driving devices 2, impact to the lamp units 3, or forced movement of the lamp units 3, upon removal of the interfering object (if any), power to the lamp units 3 is deactivated to restore the lamp units 3 to the default position as described herein above, and is subsequently activated to continue with normal operation of the lamp assembly of the present invention. Furthermore, the left and right limit sensing components 43 also serve to limit range of angular rotation of the transmission axles 21 to avoid tangling of electric wires.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lamp assembly adapted for use with a vehicle that includes a steering linkage system, said lamp assembly comprising:
a base;
a lamp unit;
a driving device mounted to said base, and including a transmission axle that is coupled to said lamp unit, and a drive unit for driving said transmission axle to rotate in opposite first and second directions relative to said base such that said lamp unit is movable to a selected one of a default position, where said lamp unit has an illuminating direction parallel to a vehicle axis, and left and right limit positions, where the illuminating direction of said lamp unit forms left and right limit angles with the vehicle axis, respectively;
a detecting device including a detected component provided on said transmission axle, and a default sensing component provided on said base and cooperating with said detected component so as to generate a default position signal when said lamp unit is at the default position; and
a control device coupled to said driving device and said detecting device,
said control device being adapted to be coupled to the steering linkage system and being further operable in response to user manipulation of the steering linkage system so as to control said driving device to move said lamp unit according to angular displacement of the steering linkage system,
wherein said control device is operable so as to control said driving device to restore said lamp unit to the default position under a predetermined condition with reference to the default position signal regardless of the angular displacement of the steering linkage system.

2. The lamp assembly as claimed in claim 1, wherein said drive unit of said driving device includes a motor, a drive gear coupled to said motor, and a driven gear coupled to said transmission axle and driven by said drive gear.

3. The lamp assembly as claimed in claim 2, wherein said drive unit of said driving device further includes a speed-reducing gear unit that meshes with said drive and driven gears.

4. The lamp assembly as claimed in claim 1, wherein said detecting device further includes left and right limit sensing components having said transmission axle disposed therebetween, each of said left and right limit sensing components cooperating with said detected component so as to generate a limit position signal when said lamp unit is at a corresponding one of the left and right limit positions, and providing the limit position signal to said control device to enable said control device to stop continued rotation of said transmission axle in one of the first and second directions when said lamp unit reaches the corresponding one of the left and right limit positions.

5. The lamp assembly as claimed in claim 4, wherein each of said left and right limit sensing components includes a contact switch that is contacted by said detected component when said lamp unit is at the corresponding one of the left and right limit positions.

6. The lamp assembly as claimed in claim 4, wherein each of the left and right limit angles is at least 90 degrees.

7. The lamp assembly as claimed in claim 1, wherein said default sensing component includes an optical sensor, and said detected component includes a light shield detected by said optical sensor when said lamp unit is at the default position.

8. The lamp assembly as claimed in claim 1, wherein said control device includes:
a controller for controlling operation of said driving device and for receiving the default position signal from said detecting device; and
a signal generator adapted to be coupled to the steering linkage system and adapted to generate an angular displacement signal indicative of the angular displacement of the steering linkage system, said signal generator being coupled to said controller so as to provide the angular displacement signal thereto.

9. The lamp assembly as claimed in claim 1, wherein said control device includes:
a controller for controlling operation of said driving device and for receiving the default position signal from said detecting device;
a state setting unit coupled to said controller for selectively enabling and disabling operation of said controller in an automatic control mode, where said lamp unit is moved automatically under control of said controller to change the illuminating direction according to the angular displacement of the steering linkage system; and
a control panel coupled to said state setting unit and including at least one control key for controlling activation and deactivation of said lamp unit, and a mode key for selectively enabling and disabling the automatic control mode.

10. The lamp assembly as claimed in claim 1, wherein:
said control device includes a controller for controlling operation of said driving device and for receiving the default position signal from said detecting device;
said detecting device further including a speed detector adapted to detect vehicle speed and to generate a vehicle speed signal corresponding to the vehicle speed detected thereby, said speed detector being coupled to said controller so as to provide the vehicle speed signal thereto;
said controller controlling said driving device to restore said lamp unit to the default position when the vehicle speed signal indicates zero vehicle speed regardless of the angular displacement of the steering linkage system, and to move said lamp unit to change the illuminating direction according to the angular displacement of the steering linkage system when the vehicle speed signal indicates non-zero vehicle speed.

11. The lamp assembly as claimed in claim 1, wherein said control device controls said driving device to restore said lamp unit to the default position each time power to said lamp unit is activated regardless of the angular displacement of the steering linkage system.

12. The lamp assembly as claimed in claim 1, wherein said control device controls said driving device to restore said lamp unit to the default position each time power to said lamp unit is deactivated regardless of the angular displacement of the steering linkage system.

13. A lamp assembly adapted for use with a vehicle that includes a steering linkage system, said lamp assembly comprising:
a base;
a lamp unit;
a driving device mounted to said base, and including a transmission axle that is coupled to said lamp unit, and a drive unit for driving said transmission axle to rotate in opposite first and second directions relative to said base such that said lamp unit is movable to a selected one of a default position, where said lamp unit has an illuminating direction parallel to a vehicle axis, and left and right limit positions, where the illuminating direction of said lamp unit forms left and right limit angles with the vehicle axis, respectively;
a detecting device including a detected component provided on said transmission axle, and a default sensing component provided on said base and cooperating with said detected component so as to generate a default position signal when said lamp unit is at the default position; and
a control device coupled to said driving device and said detecting device, said control device being adapted to be coupled to the steering linkage system and being further operable in response to user manipulation of the steering linkage system so as to control said driving device to move said lamp unit according to angular displacement of the steering linkage system,
wherein said default sensing component includes an optical sensor, and said detected component includes a light shield detected by said optical sensor when said lamp unit is at the default position.

* * * * *